US012545294B2

(12) United States Patent
Petrin et al.

(10) Patent No.: US 12,545,294 B2
(45) Date of Patent: Feb. 10, 2026

(54) PASSING VEHICLE ON SHOULDER

(71) Applicant: TORC Robotics, Inc., Blacksburg, VA (US)

(72) Inventors: Joshua Petrin, Blacksburg, VA (US); Garrett Madsen, Blacksburg, VA (US); Haseeb Chaudhry, Blacksburg, VA (US); Andrew Cunningham, Blacksburg, VA (US); John Blankenhorn, Blacksburg, VA (US); Paul Brown, Blacksburg, VA (US); William Davis, Blacksburg, VA (US); Kiron Mateti, Blacksburg, VA (US); Robert Kriener, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 231 days.

(21) Appl. No.: 18/238,438

(22) Filed: Aug. 25, 2023

(65) Prior Publication Data
US 2025/0065915 A1    Feb. 27, 2025

(51) Int. Cl.
*B60W 60/00* (2020.01)

(52) U.S. Cl.
CPC ... *B60W 60/0015* (2020.02); *B60W 2420/403* (2013.01); *B60W 2420/408* (2024.01);
(Continued)

(58) Field of Classification Search
CPC ......... B60W 60/0015; B60W 2556/45; B60W 2420/408; B60W 2420/403;
(Continued)

(56) References Cited

U.S. PATENT DOCUMENTS

| 2016/0185345 A1* | 6/2016 | Sasabuchi | B60W 30/08 701/301 |
| 2018/0267558 A1* | 9/2018 | Tiwari | H04N 23/90 |

(Continued)

FOREIGN PATENT DOCUMENTS

| DE | 102019107650 A1 * | 10/2020 | G06V 20/56 |

OTHER PUBLICATIONS

Sang-Il Oh, Object Detection and Classification by Decision-Level Fusion for Intelligent Vehicle Systems, Jan. 22, 2017, Sensors 2017 (Year: 2017).*

*Primary Examiner* — Matthias S Weisfeld
(74) *Attorney, Agent, or Firm* — Armstrong Teasdale LLP

(57) ABSTRACT

A method of passing an object on the side of the road by receiving a first signal from a first sensor configured to detect a presence of the object positioned on a shoulder of a road; determining a first value; assigning a first confidence value to a confidence level, wherein the first confidence value is associated with the first value; responsive to the first confidence value exceeding a confidence threshold, adjusting a first operating parameter of a vehicle; responsive to entering a threshold range of the object, receiving a second signal from a second sensor; determining a second value associated with the second signal; assigning a second confidence value to the confidence level, wherein the second confidence value is associated with the second value; responsive to the second confidence value exceeding a second confidence threshold, adjusting a second operating parameter of the vehicle.

20 Claims, 5 Drawing Sheets

(52) U.S. Cl.
CPC .............. *B60W 2510/0638* (2013.01); *B60W 2510/1005* (2013.01); *B60W 2510/18* (2013.01); *B60W 2510/20* (2013.01); *B60W 2556/45* (2020.02)

(58) Field of Classification Search
CPC . B60W 2510/0638; B60W 2510/1005; B60W 2510/18; B60W 2510/20
USPC ......................................................... 701/24
See application file for complete search history.

(56) References Cited

U.S. PATENT DOCUMENTS

| | | | |
|---|---|---|---|
| 2019/0176829 A1* | 6/2019 | Luders .............. | B60W 60/0015 |
| 2021/0118245 A1* | 4/2021 | Gyllenhammar ....... | G01S 17/87 |
| 2022/0342417 A1* | 10/2022 | Kobayashi ........... | G05D 1/0038 |
| 2022/0366175 A1* | 11/2022 | Yu ........................ | G05D 1/2435 |
| 2024/0257636 A1* | 8/2024 | Nelapati .............. | G08G 1/0145 |

\* cited by examiner

PASSING VEHICLE ON SHOULDER

TECHNICAL FIELD

The present disclosure relates generally to autonomous vehicles and, more specifically, to systems and methods for autonomous vehicle operation.

BACKGROUND

The use of autonomous vehicles has become increasingly prevalent in recent years, with the potential for numerous benefits, such as improved safety, reduced traffic congestion, and increased mobility for people with disabilities. Autonomous vehicles, or self-driving vehicles, are designed to sense their environment and navigate without human input. Equipped with various sensors such as radar, LiDAR, GPS, odometry, and computer vision, these vehicles aim to identify suitable navigation paths, detect obstacles, and follow traffic laws.

Despite considerable advancements in this field, existing systems still face significant challenges in accurately detecting, classifying, and responding to objects on the side of the road, especially in complex and dynamic environments. This problem is particularly prevalent with current limitations in the distance from which the autonomous vehicle can detect objects on the shoulder of the road. The problems are also prevalent in situations where an object that was initially classified as stationary by the vehicle's sensors suddenly moves into the path of the vehicle, or where the object is partially obscured or not clearly defined in the sensor's field of view.

Current autonomous driving systems often struggle with differentiating between truly stationary objects and those that may pose a threat due to sudden movement. For example, a parked car that suddenly pulls out, or a pedestrian standing by the side of the road who may step onto the roadway unexpectedly. Moreover, these systems may not effectively identify and classify objects that are partially hidden by other objects or environmental factors, such as a bicycle obscured behind a parked car, or an animal in a roadside bush.

Additionally, there are challenges related to the reliability and robustness of sensor data. Adverse weather conditions such as rain, fog, or snow can significantly degrade the performance of sensors like cameras and LiDAR, leading to false detections or missed objects. There are also issues with the sensor fusion algorithms, where the data from multiple sensors is combined to create a complete picture of the surrounding environment. Errors or discrepancies in this process can lead to incorrect object identification and inappropriate vehicle responses.

The limitations of existing autonomous vehicle systems in accurately detecting, classifying, and appropriately responding to side-of-the-road objects may impair the safety and efficiency of these vehicles.

SUMMARY

Therefore, there is a need for an improved system and method that can robustly detect, classify, and respond to potential collision threats from objects on the side of the road to enhance the overall safety and performance of autonomous vehicles.

According to an exemplary embodiment of the present disclosure, an autonomous vehicle having a sensor suite including a camera system and LiDAR system may detect and classify a side-of-the-road object in at least two phases: (1) low-fidelity-presence detection and (2) high-fidelity-object classification. In an exemplary embodiment, the autonomous vehicle detects the presence of a side-of-the-road object from image data collected from a camera system of the autonomous vehicle at a maximum perception distance. Then, as the autonomous vehicle nears the side-of-the-road object, additional sensors (e.g., LiDAR sensors or radar sensors) collect higher-fidelity image or point data to further classify the object to make additional operational decisions based on higher probability scenarios. The autonomous vehicle may first make certain operational adjustments to the operating parameters of the autonomous vehicle based on the initial presence detection, such as beginning to coast, decreasing acceleration, or enabling a warning signal (e.g., a turn signal). Once the autonomous vehicle classifies the side-of-the-road object during the second phase of detection and classification, the autonomous vehicle may adjust further the operating parameter or adjust a second operating parameter (e.g., steer the autonomous vehicle to change lanes).

In some aspects, the techniques described herein relate to a computer-implemented method including: receiving, by a processor, a first signal from a first sensor configured to detect a presence of an object positioned on a shoulder of a road; determining, by the processor, a first value associated with the first signal; assigning, by the processor, a first confidence value to a confidence level, wherein the first confidence value is associated with the first value; storing, by the processor, the first confidence value in a memory; responsive to the first confidence value exceeding a confidence threshold, adjusting, by the processor, a first operating parameter of a vehicle traveling on the road; responsive to entering a threshold range of the object, receiving, by the processor, a second signal from a second sensor configured to detect the presence of the object on the shoulder of the road; determining, by the processor, a second value associated with the second signal; assigning, by the processor, a second confidence value to the confidence level, wherein the second confidence value is associated with the second value; storing, by the processor, the second confidence value in the memory; and responsive to the second confidence value exceeding a second confidence threshold, adjusting, by the processor, a second operating parameter of the vehicle.

In some aspects, the techniques described herein relate to a computer-implemented method, further including: classifying, by the processor, the object from a binary classification model based at least on the first value and the first confidence value; and classifying, by the processor, the object from a detailed classification model based at least on the second value and the second confidence value.

In some aspects, the techniques described herein relate to a computer-implemented method, wherein the first sensor is configured to collect data from which the processor can determine a binary classification of the object, and the second sensor is configured to collect data from which the processor can determine a detailed classification of the object.

In some aspects, the techniques described herein relate to a computer-implemented method, wherein the first sensor and the second sensor are positioned on the vehicle traveling on the road.

In some aspects, the techniques described herein relate to a computer-implemented method, wherein the vehicle is an autonomous vehicle.

In some aspects, the techniques described herein relate to a computer-implemented method, wherein the first sensor is an image-collecting camera, and the second sensor is a light detection and ranging ("LiDAR") sensor.

In some aspects, the techniques described herein relate to a computer-implemented method, wherein the first operating parameter and the second operating parameter are one of an engine speed, steering angle, braking amount, gear engagement, lighting status, and aural warning.

In some aspects, the techniques described herein relate to a computer-implemented method, wherein the processor is remote to the vehicle and communicatively coupled to a vehicle control system locally housed on the vehicle, the vehicle control system configured to implement adjusting the first operating parameter and the second operating parameter.

In some aspects, the techniques described herein relate to a computer-implemented method, wherein the second operating parameter is adjusted to avoid the vehicle running out of a drivable surface.

In some aspects, the techniques described herein relate to a system including: a non-transitory computer-readable medium including instructions that are configured to be executed by at least one processor associated with an automated vehicle to: receive a first signal from a first sensor configured to detect a presence of an object positioned on a shoulder of a road; determine a first value associated with the first signal; assign a first confidence value to a confidence level, wherein the first confidence value is associated with the first value; store the first confidence value in a memory; responsive to the first confidence value exceeding a confidence threshold, adjust a first operating parameter of a vehicle traveling on the road; responsive to entering a threshold range of the object, receive a second signal from a second sensor configured to detect the presence of the object on the shoulder of the road; determine a second value associated with the second signal; assign a second confidence value to the confidence level, wherein the second confidence value is associated with the second value; store the second confidence value in the memory; and responsive to the second confidence value exceeding a second confidence threshold, adjust a second operating parameter of the vehicle.

In some aspects, the techniques described herein relate to a system, further including: classify the object from a binary classification model based at least on the first value and the first confidence value; and classify the object from a detailed classification model based at least on the second value and the second confidence value.

In some aspects, the techniques described herein relate to a system, wherein the first sensor is configured to collect data from which the at least one processor can determine a binary classification of the object, and the second sensor is configured to collect data from which the at least one processor can determine a detailed classification of the object.

In some aspects, the techniques described herein relate to a system, wherein the first sensor and the second sensor are positioned on the vehicle traveling on the road.

In some aspects, the techniques described herein relate to a system, wherein the vehicle is an autonomous vehicle.

In some aspects, the techniques described herein relate to a system, wherein the first sensor is an image-collecting camera, and the second sensor is a light detection and ranging ("LIDAR") sensor.

In some aspects, the techniques described herein relate to a system, wherein the first operating parameter and the second operating parameter are one of an engine speed, steering angle, braking amount, gear engagement, lighting status, and aural warning.

In some aspects, the techniques described herein relate to a system, wherein the at least one processor is remote to the vehicle and communicatively coupled to a vehicle control system locally housed on the vehicle, the vehicle control system configured to implement adjusting the first operating parameter and the second operating parameter.

In some aspects, the techniques described herein relate to a system, wherein the second operating parameter is adjusted to avoid the vehicle running out of a drivable surface.

In some aspects, the techniques described herein relate to a vehicle including a processor configured to: receive a first signal from a first sensor configured to detect a presence of an object positioned on a shoulder of a road; determine a first value associated with the first signal; assign a first confidence value to a confidence level, wherein the first confidence value is associated with the first value; store the first confidence value in a memory; responsive to the first confidence value exceeding a confidence threshold, adjust a first operating parameter of the vehicle; responsive to entering a threshold range of the object, receive a second signal from a second sensor configured to detect the presence of the object on the shoulder of the road; determine a second value associated with the second signal; assign a second confidence value to the confidence level, wherein the second confidence value is associated with the second value; store the second confidence value in the memory; and responsive to the second confidence value exceeding a second confidence threshold, adjust a second operating parameter of the vehicle.

In some aspects, the techniques described herein relate to a vehicle, wherein the processor is further configured to: classify the object from a binary classification model based at least on the first value and the first confidence value; and classify the object from a detailed classification model based at least on the second value and the second confidence value.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

DETAILED DESCRIPTION

Figure 1:
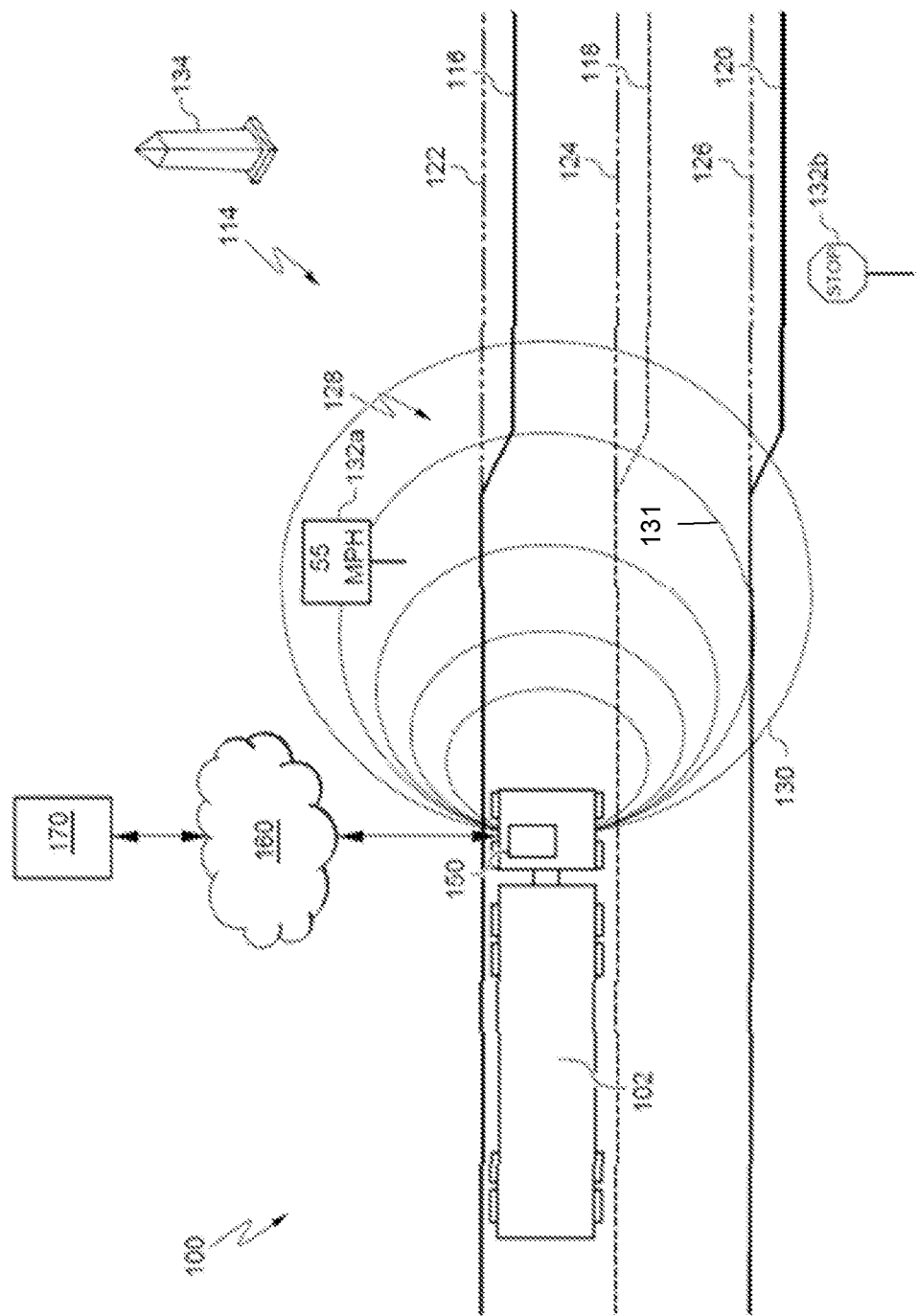
FIG. 1 is a bird's-eye view of a roadway including a schematic representation of a vehicle and aspects of an autonomy system of the vehicle, according to an embodiment.

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Autonomous vehicle virtual driver systems are structured on three pillars of technology: 1) perception, 2) maps/localization, and 3) behaviors planning and control. The mission of perception is to sense an environment surrounding an ego vehicle and interpret it. To interpret the surrounding environment, a perception engine may identify and classify objects or groups of objects in the environment. For example, an autonomous system may use a perception engine to identify one or more objects (e.g., pedestrians, vehicles, debris, etc.) in the road before a vehicle and classify the objects in the road as distinct from the road. In other examples, the autonomous system may use the perception engine to identify one of more objects (e.g., pedestrians, vehicles, debris, etc.) on the shoulder of the road and classify the object on the shoulder of the road as distinct from the shoulder. The mission of maps/localization is to determine where in the world, or where on a pre-built map, the ego vehicle is located. One way to do this is to sense the environment surrounding the ego vehicle (e.g., perception systems) and to correlate features of the sensed environment with details (e.g., digital representations of the features of the sensed environment) on a digital map. Once the systems on the ego vehicle have determined its location with respect to the map features (e.g., intersections, road signs, etc.) the ego vehicle ("ego") can plan maneuvers and/or routes with respect to the features of the environment. The mission of behaviors, planning, and control is to make decisions about how the ego should move through the environment to get to its goal or destination. It consumes information from the perception engine and the maps/localization modules to know where it is relative to the surrounding environment and what other traffic actors are doing.

Localization, or the estimate of ego vehicle's position to varying degrees of accuracy, often with respect to one or more landmarks on a map, is critical information that may enable advanced driver-assistance systems or self-driving cars to execute autonomous driving maneuvers. Such maneuvers can often be mission or safety related. For example, localization may be a prerequisite for an ADAS or a self-driving car to provide intelligent and autonomous driving maneuvers to arrive at point C from points B and A. Currently existing solutions for localization may rely on a combination of Global Navigation Satellite System (GNSS), an inertial measurement unit (IMU), and a digital map (e.g., an HD map or other map file including one or more semantic layers).

Localizations can be expressed in various forms based on the medium in which they may be expressed. For example, a vehicle could be globally localized using a global positioning reference frame, such as latitude and longitude. The relative location of the ego vehicle with respect to one or more objects or features in the surrounding environment could then be determined with knowledge of ego vehicle's global location and the knowledge of the one or more objects' or feature's global location(s). Alternatively, an ego vehicle could be localized with respect to one or more features directly. To do so, the ego vehicle may identify and classify one or more objects or features in the environment and may do this using, for example, its own onboard sensing systems (e.g., perception systems), such as LiDARs, cameras, radars, etc. and one or more on-board computers storing instructions for such identification and classification.

Environments intended for use by vehicles, whether such vehicles include autonomous features or not, tend to be pattern rich. That is, environments intended for use by automobiles are structured according to a pattern(s) that is recognizable by human drivers and increasingly by autonomous systems (e.g., all stop signs use same shape/color, all stop lights are green/yellow/red, etc.) The patterns enable and, indeed, may require predictable behavior by the operators of the vehicles in the environment, whether human or machine. One such pattern is used in lane indications, which may indicate lane boundaries intended to require particular behavior within the lane (e.g., maintaining a constant path with respect to the lane line, not crossing a solid lane line, etc.) Due to their consistency, predictability, and ubiquity, lane lines may serve as a good basis for a lateral component localization.

Referring to FIG. 1, the present disclosure relates to autonomous vehicles, such as an autonomous truck 102 having an autonomy system 150. The autonomy system 150 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. The present disclosure sometimes refers to autonomous vehicles as ego vehicles. The autonomy system 150 may be structured on at least three aspects of technology: (1) perception, (2) maps/localization, and (3) behaviors planning and control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, etc.) and features of the roadway (e.g., lane lines, objects on the shoulder) around truck 102, and classify the objects in and around the road distinctly.

The maps/localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map.

Once the systems on the truck 102 have determined its location with respect to the digital map features (e.g., location on the roadway, upcoming intersections, road signs, etc.), the truck 102 can plan and execute maneuvers and/or routes with respect to the features of the digital map. The behaviors, planning, and control aspects of the autonomy system 150 may be configured to make decisions about how the truck 102 should move through the environment to get to its goal or destination. It may consume information from the perception and maps/localization modules to know where it is relative to the surrounding environment and what other objects and traffic actors are doing.

FIG. 1 further illustrates a system 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously. However, in some embodiments, the truck 102 may communicate with the network 160 or server 170 during operation to implement the autonomy system 150.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous having varying degrees of autonomy or autonomous functionality.

Figure 2:
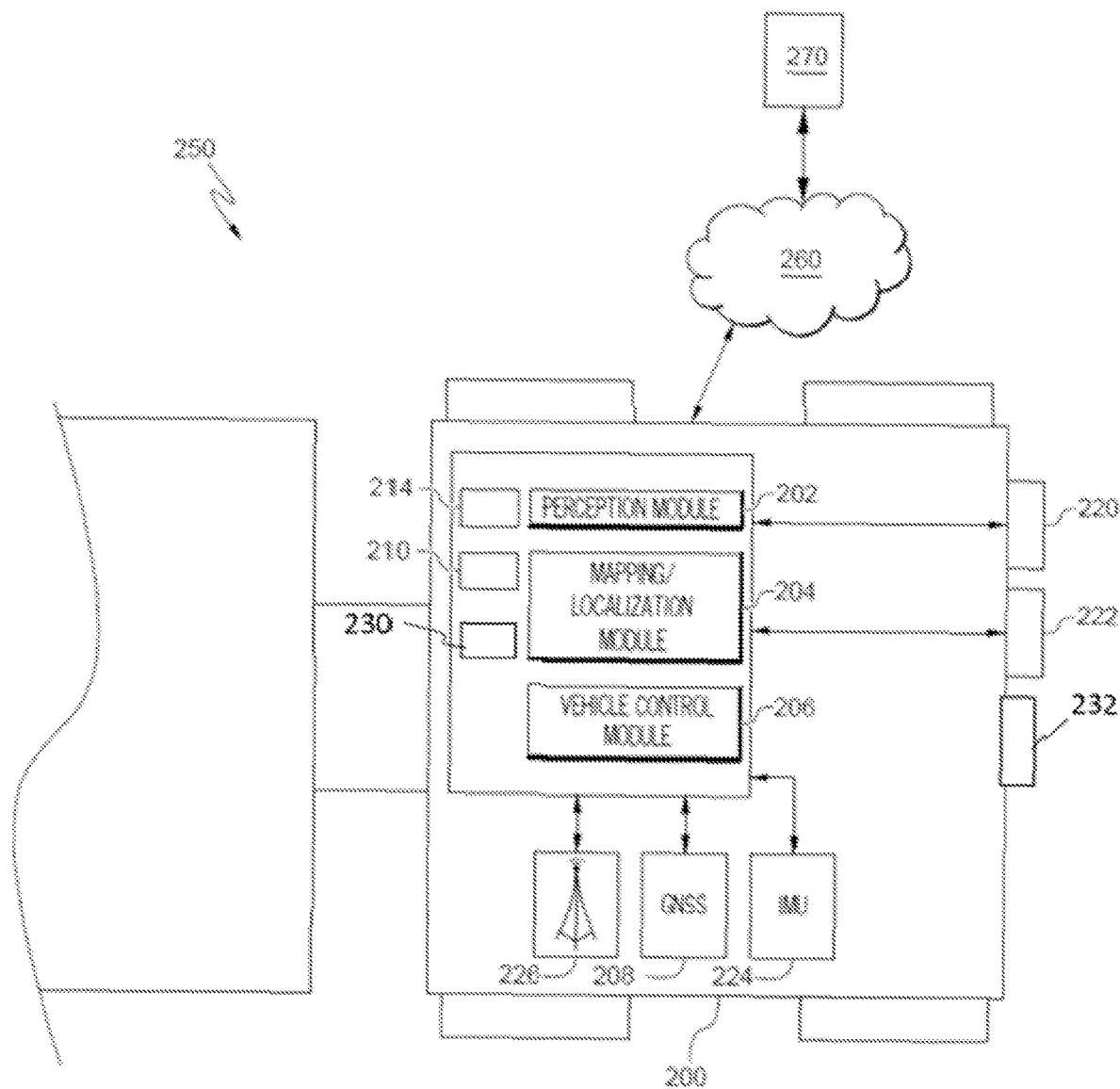
FIG. 2 is a schematic of the autonomy system of the vehicle, according to an embodiment.

With reference to FIG. 2, an autonomy system 250 may include a perception system including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As show in FIG. 1, the perception systems aboard the autonomous vehicle may help the truck 102 perceive its environment out to a perception radius 130. The actions of the truck 102 may depend on the extent of perception radius 130. In some embodiments, the truck 102 may be able to perceive to different perception radius with different sensor equipment (e.g., camera system 220 and LiDAR system 222). For example, the truck 102 may be able to perceive to perception radius 130 with the camera system 220, but may only be able to perceive to radius 131 with the LiDAR system 222 or radar system 232.

The camera system 220 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., forward of the truck 102) or may surround 360 degrees of the truck 102. In some embodiments, the image data generated by the camera system(s) 220 may be sent to the perception module 202 and stored, for example, in memory 214. In some embodiments, the camera system 220 may be able to capture reliable image data at a distance farther than the LiDAR system 222.

The LiDAR system 222 may include a laser generator and a detector and can send and receive LiDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may estimate strength or effective mass of an object, as objects made out of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor process received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5g, etc.) In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand. In some embodiments, the truck 200 may not be in constant communication with the network 260 and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck 200. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck 200. Various other known circuits may be associated with the autonomy system 250, including signal-conditioning circuitry, communication circuitry, actuation circuitry, and other appropriate circuitry.

Figure 5:
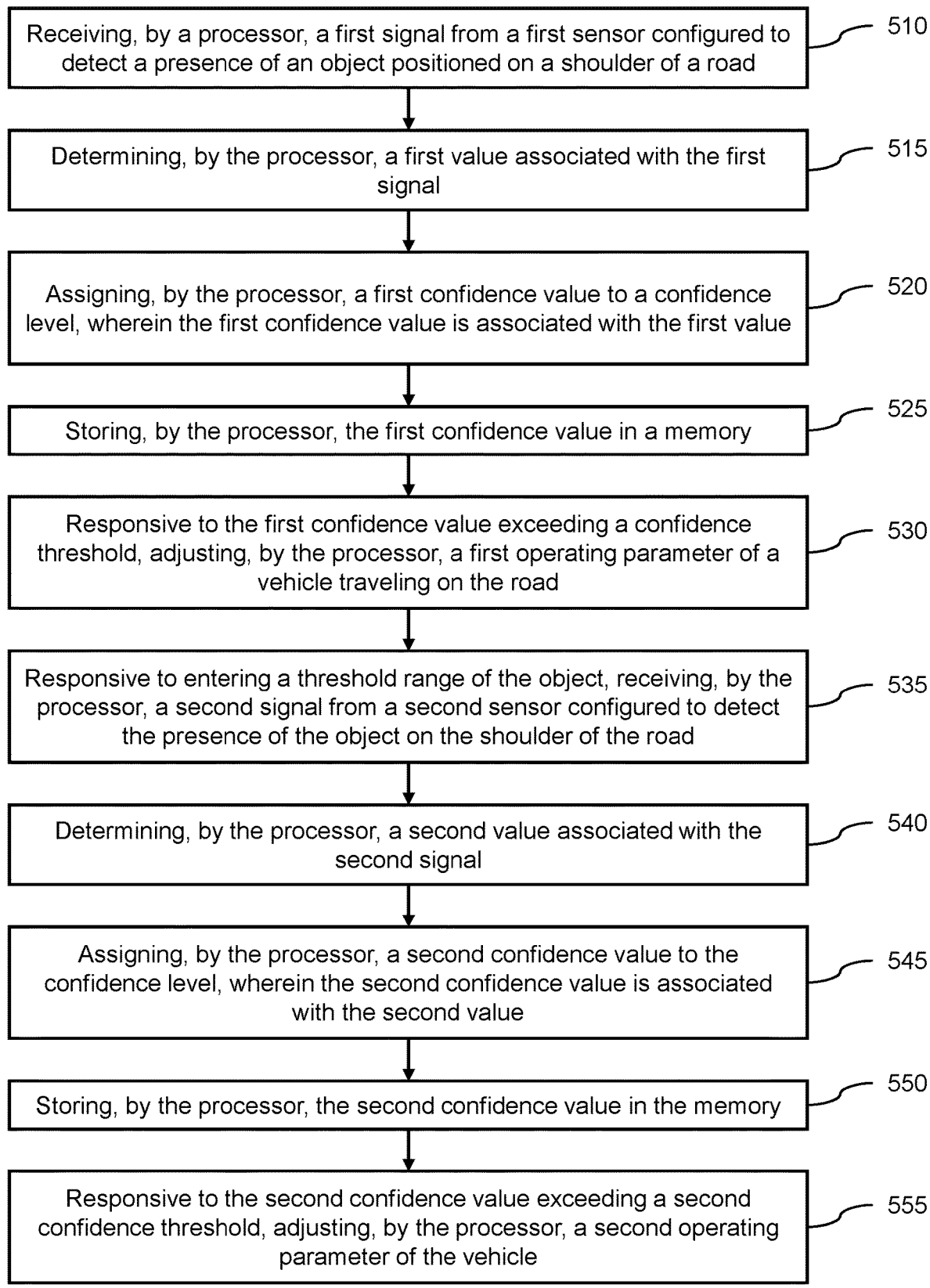
FIG. 5 is a process for using the autonomy system of the vehicle, according to an embodiment.

The memory 214 of autonomy system 250 may store data and/or software routines that may assist the autonomy system 250 in performing its functions, such as the functions of the perception module 202, the mapping/localization module 204, the vehicle control module 206, a collision analysis module 230, the method 500 described herein with respect to FIG. 5. Further, the memory 214 may also store data received from various inputs associated with the autonomy system 250, such as perception data from the perception system.

As noted above, perception module 202 may receive input from the various sensors, such as camera system 220, LiDAR system 222, GNSS receiver 208, and/or IMU 224 (collectively "perception data") to sense an environment surrounding the truck 200 and interpret it. To interpret the surrounding environment, the perception module 202 (or "perception engine") may identify and classify objects or groups of objects in the environment. For example, the truck 102 may use the perception module 202 to identify one or more objects (e.g., pedestrians, vehicles, debris, etc.) or features of the roadway 114 (e.g., intersections, road signs, lane lines, etc.) before or beside a vehicle and classify the objects in the road. In some embodiments, the perception module 202 may include an image classification function and/or a computer vision function.

The system 100 may collect perception data. The perception data may represent the perceived environment surrounding the vehicle, for example, and may be collected using aspects of the perception system described herein. The perception data can come from, for example, one or more of the LiDAR system, the camera system, and various other externally-facing sensors and systems on board the vehicle (e.g., the GNSS receiver, etc.). For example, on vehicles having a sonar or radar system, the sonar and/or radar systems may collect perception data. As the truck 102 travels along the roadway 114, the system 100 may continually receive data from the various systems on the truck 102. In some embodiments, the system 100 may receive data periodically and/or continuously. With respect to FIG. 1, the truck 102 may collect perception data that indicates presence of the lane lines 116, 118, 120. Features perceived by the vehicle should generally track with one or more features stored in a digital map (e.g., in the mapping/localization module 204). Indeed, with respect to FIG. 1, the lane lines that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario the vehicle approaches a new bend 128 in the road that is not stored in any of the digital maps onboard the truck 102 because the lane lines 116, 118, 120 have shifted right from their original positions 122, 124, 126. This lane-line sensing capabilities may be beneficial in determining the location of the shoulder of the road and any corresponding objects thereon.

The system 100 may compare the collected perception data with stored data. For example, the system may identify and classify various features detected in the collected perception data from the environment with the features stored in a digital map. For example, the detection systems may detect the lane lines 116, 118, 120 and may compare the detected lane lines with lane lines stored in a digital map. Additionally, the detection systems could detect the road signs 132a, 132b and the landmark 134 to compare such features with features in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 100 interacts with the various features. Based on the comparison of the detected features with the features stored in the digital map(s), the system may generate a confidence level, which may represent a confidence of the vehicle in its location with respect to the features on a digital map and hence, its actual location.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

At various distances, the image classification function may be able to detect and classify certain objects with varying degrees of fidelity. For example, during the operation of truck 102, the image classification system may use data collected from the camera system 220 to detect the presence of an object at a maximum perception distance (e.g., perception radius 130). This may be a binary classification at the maximum perception distance: either an object is present or not. As the truck 102 proceeds towards the object, the camera system 220 may collect higher resolution data from which the image classification function may make higher fidelity classifications. For example, the image classification system may be able to extend its classification from simply the presence of an object to what the object is (e.g., a vehicle, an animal, a pedestrian). The image classification function may utilize data from the LiDAR system 222 as well. In some examples, the data collected from the LiDAR system 222 may provide the image classification system with even higher fidelity classification capabilities than the camera system 220. The LiDAR system 222 may be able to collect object-classification data during night, during a snow storm, and in other conditions that otherwise present a traditional camera system with difficulties during perception.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.)

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200, and may correlate features of the sensed environment with details (e.g., digital representations of the features of the sensed environment) on the one or more digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connection to an external network during the mission. A centralized mapping system may be accessible via network 260 for updating the digital map(s) of the mapping/localization module 204. The digital map be built through repeated observations of the operating environment using the truck 200 and/or trucks or other vehicles with similar functionality. For instance, the truck 200, a specialized mapping vehicle, a standard autonomous vehicle, or another vehicle, can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it onboard and use it within its mapping/localization module 204. Hence, the truck 200 and other vehicles (e.g., a fleet of trucks similar to the truck 200) can generate, maintain (e.g., update), and use their own generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck 200. For example, once the systems on the truck 200 have determined its location with respect to map features (e.g., intersections, road signs, lane lines, etc.) the truck 200 may use the vehicle control module 206 and its associated systems to plan and execute maneuvers and/or routes with respect to the features of the environment. The vehicle control module 206 may make decisions about how the truck 200 will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck 200. The steering system may be any combination of mechanisms configured to adjust the heading or direction of the truck 200. The brake system may be, for example, any combination of mechanisms configured to decelerate the truck 200 (e.g., friction braking system, regenerative braking system, etc.) The vehicle control module 206 may be configured to avoid obstacles in the environment surrounding the truck 200 (such as on the shoulder of the road) and may be configured to use one or more system inputs to identify, evaluate, and modify a vehicle trajectory. The vehicle control module 206 is depicted as a single module but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

Figure 3:
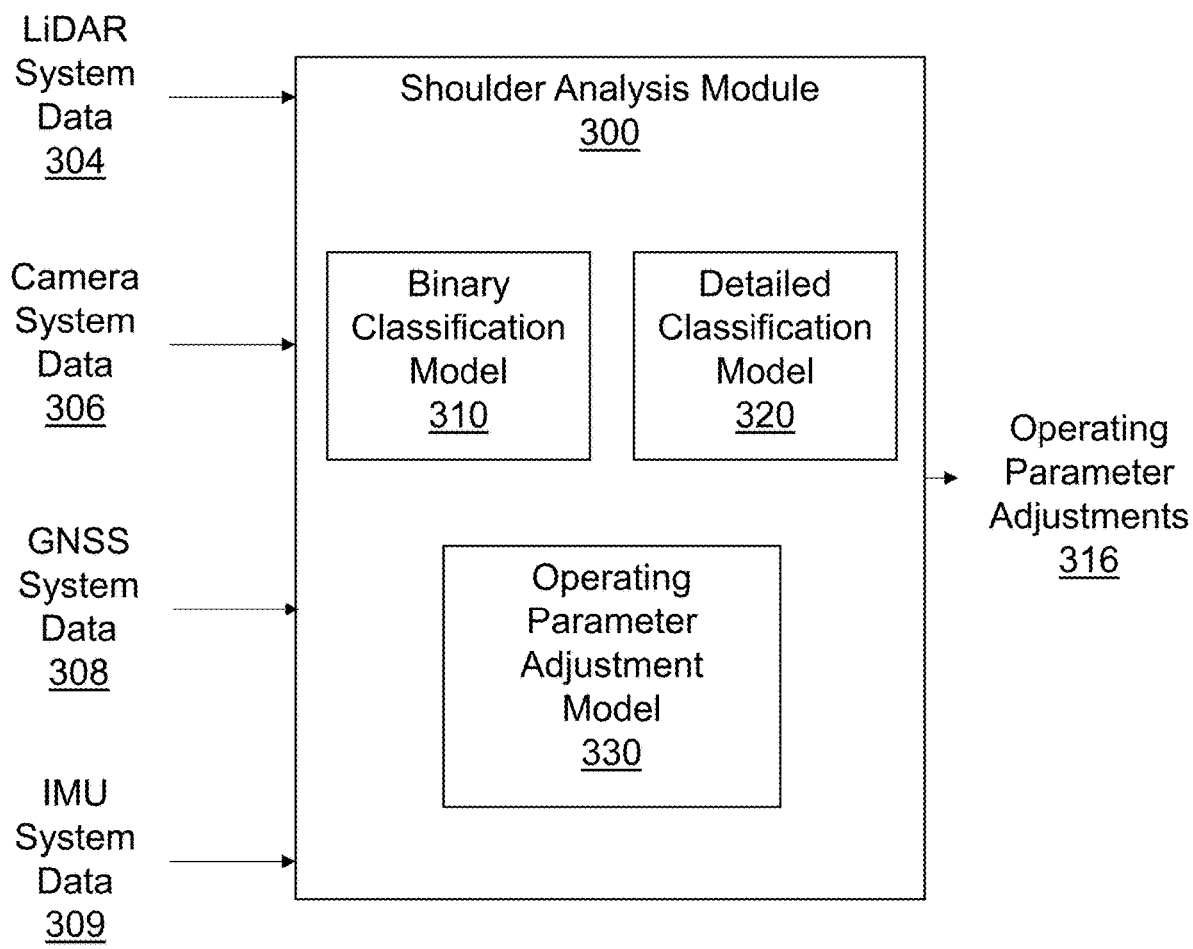
FIG. 3 is a schematic diagram of an exemplary shoulder analysis model of the autonomy system of the vehicle, according to an embodiment.

FIG. 3 shows a block diagram of a shoulder analysis module 300. In some embodiments, the shoulder analysis module 300 is included in the perception module 202 of FIG. 2. The classification module may be used to detect, classify, and respond to side-of-the-road objects encountered by the truck 102 of FIG. 1 while in operation. The shoulder analysis module 300 may include a binary classification model 310, a detailed classification model 320, and an operating parameter adjustment model 330. In some embodiments, the shoulder analysis module 300 includes more or less of the models described herein. Inputs to shoulder analysis module 300 may include LiDAR system data 304, camera system data 306, GNSS system data 308, and IMU system data 309. Outputs of the shoulder analysis module 300 may include operating parameter adjustment signals 316.

The inputs to the shoulder analysis module 300 may be captured, for example, using of or more of the sensors of system 100 described herein (e.g., the camera system 220, LiDAR system 222, the IMU 224, and GNSS receiver 208). The shoulder analysis module 300 may be executed by one or more processors of an autonomous vehicle, such as processor 210 of the vehicle autonomy system 250. The shoulder analysis module 300 may be a part of, or may implement any of the structure or functionality, of the perception module 202, localization module 204, or vehicle control module 206, as described herein. The outputs of the shoulder analysis module 300 may be provided, for example, to respond to detection and classification of objects from the binary classification model 310 and detailed classification model 320.

Each of the binary classification model 310 and the detailed classification model 320 may be neural network models that include a number of machine learning layers. In an embodiment, the binary classification model 310 and the detailed classification model 320 may have a similar or identical architecture (e.g., number and type of layers), but may be trained to generate different values (e.g., using different image input data). Each of the binary classification model 310 and the detailed classification model 320 may include one or more feature extraction layers, which may include convolutional layers or other types of neural network layers (e.g., pooling layers, activation layers, normalization layers, etc.). Each the binary classification model 310 and the detailed classification model 320 can include one or more classification layers (e.g., fully connected layers, etc.) that can output a classification of the object based on the respective image data collected from the various sensor systems input into the classification models.

Each of the binary classification model 310 and the detailed classification model 320 can be trained to receive image data as input and generate a corresponding object value as output. The image data can include any type of image data described herein, including the LiDAR system data 304 (e.g., LiDAR images or point clouds, etc.) and the camera system data 306 (e.g., images or video frames captured by cameras of the autonomous vehicle). The object value may be a value corresponding to the presence of an object detected on the side of the road. The object value may also correspond to a detailed classification of the object detected on the side of the road.

The binary classification model 310 and the detailed classification model 320 may also be configured to generate a confidence value of the object value generated. For example, the binary classification model 310 may generate an object value (e.g., a 1 or a 0) that indicates the presence of an object on the side of the road in front of the vehicle 350. In some embodiments, the binary classification model 310 only generates an object value that indicates the presence (e.g., 1) or non-presence (e.g., 0) of an object (i.e., a binary classification) based on the camera system data 306. The binary classification model 310 may also generate a confidence value corresponding to the object value generated by the binary classification model 310. This confidence value indicates the likelihood that the object value is correctly indicating the presence or non-presence of an object. This confidence value may be influenced by several factors including data quality and quantity, model architecture and complexity, the model training process, sensor quality and calibration, environmental conditions, model evaluation and validation, and real-world testing and feedback.

Data quality and quantity: The generated confidence level may be affected by the quality and quantity of the collected data during the binary classification process. The more data collected, and the higher the quality of the data, the binary classification model 310 may generate a higher confidence value. The quality and quantity of the training data may also affect the binary classification model's generated confidence level. The binary classification model 310 may generate higher confidence levels as larger and more diverse datasets with accurately labeled examples are used during initial and continuing training.

Model architecture and complexity: The architecture and complexity of the model itself may play role in influencing the generated confidence value. Advanced deep learning models with multiple layers and sophisticated algorithms may generate higher confidence values compared to simpler models. So, as the binary classification model 310 is trained and developed with more layers and sophisticated algorithms, the binary classification model 310 may output a higher confidence value upon classifying an object.

Sensor quality and calibration: The accuracy and calibration of the sensors used in data collection, such as cameras and LiDAR, directly affect the confidence level. High-quality, well-calibrated sensors provide more reliable input, resulting in a higher confidence level. Thus, the binary classification model 310 may generate higher confidence values immediately after calibration of the utilized sensors (e.g., cameras), and the binary classification model 310 may gradually decreased its generated confidence value as time passes from the most previous calibration.

Environmental conditions: Variations in lighting conditions, weather conditions, and other environmental factors can influence the model's confidence level. Robust models that have been trained on diverse environmental conditions tend to perform better and exhibit higher confidence levels. However, all things being equal, the binary classification model 310 may generate a lower confidence value during conditions that are not ideal for capturing visual image data from the camera system data 306 (e.g., snow, rain, low light, hail, fog, smoke, obstructed view, size of object).

Model evaluation and validation: The metrics used to evaluate and validate the model's performance also impact the confidence level. Metrics like precision, recall, and accuracy help assess the model's ability to correctly detect objects on the side of the road and contribute to the generated confidence level.

Real-world testing and feedback: Continuous real-world testing, feedback, and iterative improvements contribute to higher confidence levels. Incorporating user feedback, identifying and addressing edge cases, and refining the model based on real-world scenarios help increase the overall confidence level. As the binary classification model 310 goes through additional training, testing, and feedback, the confidence value may increase as the model's accuracy increases.

These factors may be interconnected, and a combination of them may contribute to the final confidence level of the autonomous vehicle binary classification model 310.

Likewise, the detailed classification model 320 may generate a confidence value based on the detailed classification of the object generated by the detailed classification model 320. The detailed classification model 320 may generate an object value that indicates what the object on the side of the road in front of the vehicle 350 is. In some embodiments, the detailed classification model 320 generates an object value based on the LiDAR system data 304. The detailed classification model 320 may also generate a confidence value corresponding to the object value generated by the detailed classification model 320. This confidence value indicates the likelihood that the object value is correctly indicating what the object is. This confidence value may be influenced by several factors including data quality and quantity, model architecture and complexity, the model training process, sensor quality and calibration, environmental conditions, model evaluation and validation, and real-world testing and feedback. The detailed classification model 320 may also verify the object value (i.e., a presence value) generated by the binary classification model 310. This verification may be used to train both the binary classification model 310 and the detailed classification model 320.

In some embodiments, the object value (generated either by the binary classification model 310 or detailed classification model 320) is displayed to an operator of the autonomous vehicle, whether local or remote. The object value may be displayed numerically, in text, or graphically. Indeed, the object value may be displayed on a screen, hologram, or on a heads-up display. In some embodiments, the object value may be nonconventionally displayed on a heads-up display on a windshield of the vehicle with a graphic of the classified object as determined by the detailed classification model 320. For example, if the detailed classification model 320 determines that the object on the side of the road is an emergency vehicle, the system may display an emergency vehicle on the heads-up display where the vehicle is. Further, in another nonconventional example, the system may communicate with a mapping entity to inform the mapping entity of the presence of an object and the classification of the object. This may allow the mapping entity to display the presence and classification of the object to all users of the mapping product of the mapping entity. In some examples the truck 102 is one of a fleet of trucks, and the presence and classification information is communicated to the fleet of trucks via the network 160.

Each of the binary classification model 310 and the detailed classification model 320 may be trained as part of the machine learning models described herein. The binary classification model 310 and the detailed classification model 320 can be trained by one or more computing systems or servers, such as the processors 210, as described herein. For example, the binary classification model 310 and the detailed classification model 320 may be trained using supervised and/or unsupervised training techniques. For example, using a supervised learning approach, the binary classification model 310 and the detailed classification model 320 may be trained using providing training data and labels corresponding to the training data (e.g., as ground truth). The training data may include a respective label for each of binary classification model 310 and the detailed classification model 320 for a given input image or collected data. During training, both the binary classification model 310 and the detailed classification model 320 may be provided with the same input data, but may be trained using different and respective labels.

During training, input image data can be propagated through each layer of the binary classification model 310 and the detailed classification model 320 until respective output values are generated. The output values can be utilized with the respective presence and classification truth labels associated with the input image data to calculate loss values for the binary classification model 310 and the detailed classification model 320. Some non-limiting example loss functions used to calculate the loss values include mean squared error, cross-entropy, and hinge loss. The trainable parameters of the binary classification model 310 and the detailed classification model 320 can then be modified according to their respective loss values using a backpropagation technique (e.g., gradient descent or another type of optimizer, etc.) to minimize the loss values. The binary classification model 310 and the detailed classification model 320 can be iteratively trained until a training termination condition (e.g., a maximum number of iterations, a performance threshold determined using a validation dataset, a rate of change in model parameters falling below a threshold, etc.) has been reached.

Once trained, the binary classification model 310 and the detailed classification model 320 can be provided to the shoulder analysis module 300 of one or more autonomous vehicles (e.g., the truck 102) via a network (e.g., the network 160) or another communications interface. Each of the binary classification model 310 and the detailed classification model 320 can then be executed using data sensor data (e.g., the LiDAR system data 304, the camera system data 306, etc.) captured by the sensors of the autonomous vehicle as the autonomous vehicle operates on a roadway. The shoulder analysis module 300 can execute each of the binary classification model 310 and the detailed classification model 320 by propagating the input data through the binary classification model 310 and the detailed classification model 320 to generate one or more object values (to represent at least one of a presence and a classification of an object).

In some implementations, the shoulder analysis module 300 can perform error checking on the object value. For example, if the binary classification model 310 detects (e.g., based on collected image data from the camera system data 306) the presence of an object but the detailed classification model 320 does not detect the presence of an object, the shoulder analysis module 300 may generate an error message in a log or other error file.

Each of the object values generated by the binary classification model 310 and detailed classification model 320 can be provided to the localization module 204. The localization module 204 can utilize the object values, along with any other input data of the analysis module (e.g., the LiDAR system data 304, the camera system data 306, the GNSS system data 308, and the IMU system data 309, etc.) to localize the truck 102 or other vehicles within the fleet in which the truck 102 is a part of. For example, the localization module 204 can localize the truck 102 by correlating the location of the object with longitudinal position data using, for example, the localization module 204. The longitudinal position data may be generated based on one or more of, for example, the GNSS system data 308 and the IMU system data 309. Localizing the truck 102 can include generating an accurate lateral position and an accurate longitudinal position based on the GNSS and the IMU.

The operating parameter adjustment model 330 may be used to adjust any number of operating parameters of the truck 102. Operating parameters may include steering angles, braking amount, selective braking, regenerative braking, air braking, emergency braking, engine speed, transmission gear selection, clutch engagement, suspension rigidity, suspension height, warning light status, auditory warning signals, battery cooling, battery discharge rate, motor speed, data transmission, route planning, power distribution between wheels, anti-lock braking, gear engagement, lighting status, aural warning, etc.

The operating parameter adjustment model 330 may automatically determine what operating parameter to adjust and by how much based on the object values generated by the binary classification model 310 and detailed classification model 320. The operating parameter adjustment model 330 may then transmit the determined adjustment to the vehicle control system to implement the adjustments.

Figure 4:
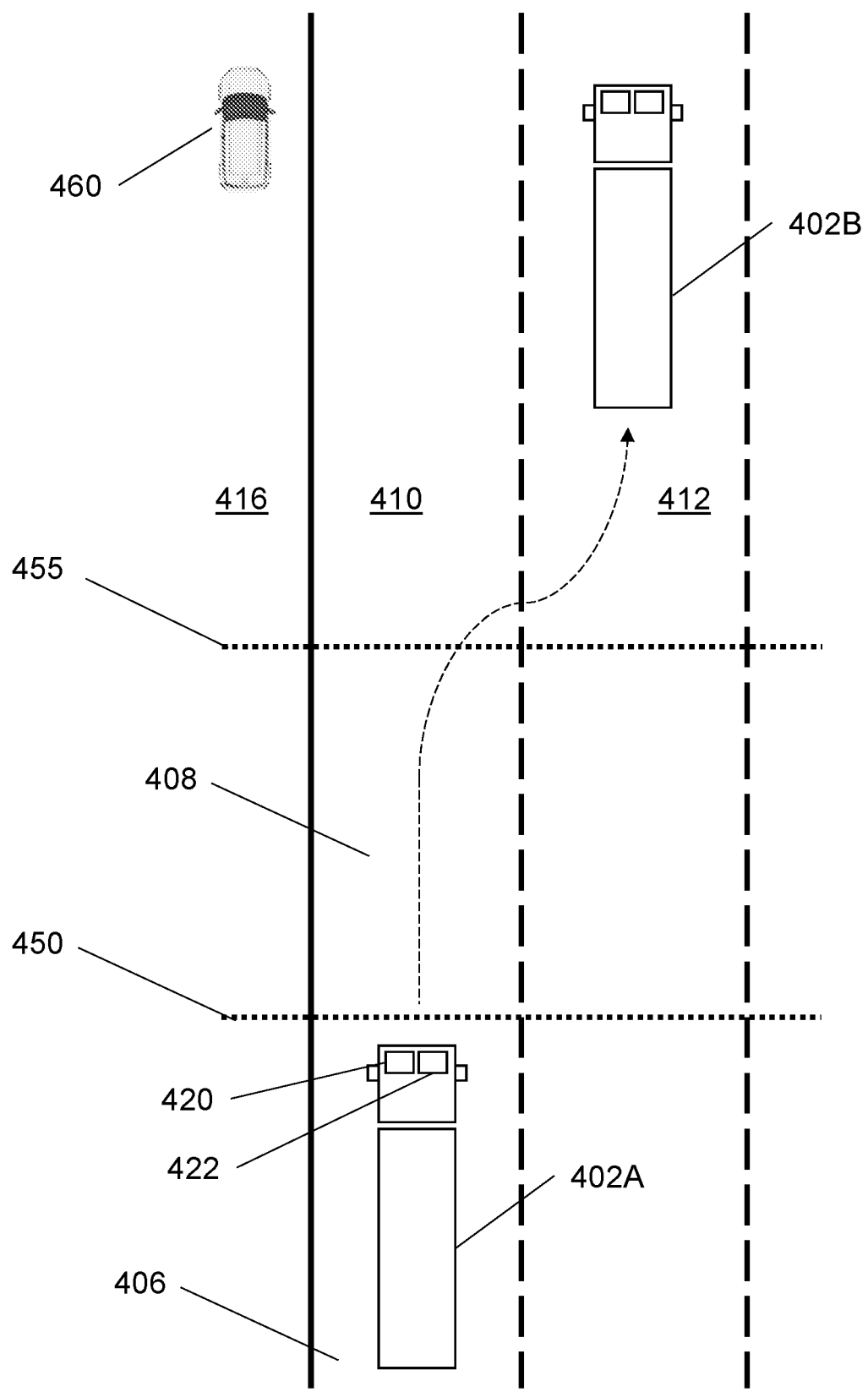
FIG. 4 is a bird's-eye view of a roadway scenario including a schematic representative of an autonomous vehicle and a target object on a shoulder of the roadway, according to an embodiment.

Turning now to FIG. 4, an example implementation of the shoulder analysis module 300 of FIG. 3. As described herein, certain image-collecting systems may have different ranges of perception. For example, the LiDAR system 222 or the radar system 232 of FIG. 2 may be able to accurately detect and classify objects on the side of the road at a perception radius 131, as shown in FIG. 1. The camera system data 306, however, may be able to accurately detect and classify (albeit, in some cases with less fidelity) an object on the side of the road at perception radius 130. These varying degrees of accuracy and perception ranges may be in part to limitations of the current technology, weather conditions, viewing angle conditions, damaged components, miscalibration, etc. Similarly, sonar, radar, and additional systems may have corresponding perception ranges and fidelity that may further be implemented in the methods and systems disclosed herein.

FIG. 4 illustrates an autonomous vehicle 402A, a left lane 410, a right lane 412, and a shoulder 416. Additionally, an abandoned vehicle 460 is depicted on the shoulder 416 of the road. A camera threshold 450 is shown and a LiDAR threshold 455 is shown. The thresholds correspond to the respective locations at which the camera system and the LiDAR systems can perceive the abandoned vehicle 460. The autonomous vehicle 402A is shown to have both a camera system 420 and a LiDAR system 422, as described in FIG. 2. Additionally, autonomous vehicle 402A may include the shoulder analysis module 300 of FIG. 3.

The autonomous vehicle 402A may be operating in the pre-perception zone 406. As the autonomous vehicle 402A passes the camera threshold 450, the camera system 420 is able to perceive the abandoned vehicle 460 on the shoulder 416. The space between the camera threshold 450 and LiDAR threshold 455 may be termed the camera perception area 408. The camera system 420 captures image data from a camera sensor and transmits that information to a binary classification model, such as binary classification model 310 of FIG. 3. The binary classification model 310 receives the image data collected from the camera system 420 and determines an object value to indicate the presence of the abandoned vehicle 460. Once the binary classification model 310 determines the presence of an object, a confidence value may be generated by the binary classification model 310 that indicates the confidence of the model. Upon determining the presence (above some confidence level threshold) of the abandoned vehicle 460 the operating parameter adjustment model 330 begins making determinations as to whether or not to adjust any operating parameters of the autonomous vehicle 402A. For example, the operating parameter adjustment model 330 may stop accelerating and begin coasting. The operating parameter adjustment model 330 may, upon determining the presence of the object, begin searching for an opening to change lanes to right lane 412. The system may not know if it needs to change lanes at this time because it is only aware of the presence of the object. The operating parameter adjustment model 330 may turn on a turn signal to begin opening up a lane change space if there does not appear to be an opening to make a lane change.

These initial adjustments, in some embodiments, may be made with only the gathered information from camera system 420 that an object is present on the shoulder 416, and are made prior to the LiDAR threshold 455. In this way, the autonomous vehicle 402A is increasing the number of options and time to make decisions/adjustments prior to reaching abandoned vehicle 460.

Determining a course of travel and the associated operating parameter that must be adjusted to implement the determined course of travel requires time to process and compute. As such, the more time to process and compute that the system (e.g., shoulder analysis module 300) has, the better the decisions can be made. Conventional system have one stage of adjustments. The disclosed two-step stage of adjustments (at the camera threshold 450 and the LiDAR threshold 455) is non-conventional and solves the issue of making adjustments by expanding the amount of information the shoulder analysis module 300 has at an earlier moment in time.

Once reaching the LiDAR threshold 455, the autonomous vehicle 402A has already made any necessary initial adjustments. Upon reaching LiDAR threshold 455, the autonomous vehicle 402A is able to gather image data from the LiDAR system 422. The image data from the LiDAR system 422 is gathered and transmitted to the detailed classification model 320. The detailed classification model 320 then makes a detailed classification of the object on the side of the road. The detailed classification model 320 verifies the binary classification of the binary classification model 310, and then further classifies the object. In FIG. 4, the detailed classification may be, "abandoned vehicle." This classification may be made by image data from the LiDAR system 422 only, but may also be made from a fusion of the camera system 420 data and the LiDAR system 422 data. The detailed classification model 320 may use any number attributes of the vehicle to classify it, such as hazard lights, a person next to the car, smoke emitting from the car, a flat tire, an open trunk, an open hood, an open door, presence of an emergency vehicle, emergency lights, etc.

After the autonomous vehicle 402A has reached LiDAR threshold 455 and generated a detailed classification of the object on shoulder 416, the operating parameter adjustment model 330 may make secondary adjustments with the newly received image data. For example, if the detailed classification model 320 determines that the object is a vehicle, the autonomous vehicle 402A may initiate the lane change to position 402B. The operating parameter adjustment model 330 may make this decision based on any number of circumstances, as analyzed by the operating parameter adjustment model 330. For example, the law of the jurisdiction in which the 402A is operating may require the autonomous vehicle 402A to change lanes, the object on the shoulder 416 could be extending into the left lane 410, etc. In some embodiments, the detailed classifications correspond to a risk level which may be used to determine whether or not to change lanes, come to a stop, continue in current trajectory, or make some other necessary change.

FIG. 5 is a flowchart of an example method for detecting, classifying, and responding to an object on the shoulder of a road. The method may include the following steps: receiving, by a processor, a first signal from a first sensor configured to detect a presence of an object positioned on a shoulder of a road (step 510); determining, by the processor, a first value associated with the first signal (step 515); assigning, by the processor, a first confidence value to a confidence level, wherein the first confidence value is associated with the first value (step 520); storing, by the processor, the first confidence value in a memory (step 525); responsive to the first confidence value exceeding a confidence threshold, adjusting, by the processor, a first operating parameter of a vehicle traveling on the road (step 530); responsive to entering a threshold range of the object, receiving, by the processor, a second signal from a second sensor configured to detect the presence of the object on the shoulder of the road (step 535); determining, by the processor, a second value associated with the second signal (step 540); assigning, by the processor, a second confidence value to the confidence level, wherein the second confidence value is associated with the second value (step 545); storing, by the processor, the second confidence value in the memory (step 550); and responsive to the second confidence value exceeding a second confidence threshold, adjusting, by the processor, a second operating parameter of the vehicle (step 555).

At step 510, the method may receive a first signal from a first sensor configured to detect a presence of an object positioned on a shoulder of a road. The signal may represent the perceived environment surrounding the vehicle, for example, and may be collected using aspects of the perception system described herein. The perception data can come from, for example, one or more of the LiDAR system 222, the camera system 220, and various other externally-facing sensors and systems on board the vehicle (e.g., the GNSS receiver 208, etc.) For example, on vehicles having a sonar or radar system, the sonar and/or radar systems may collect perception data. As the truck 102 travels along the roadway 114, the system 100 may continuously receive data from the various systems on the truck 102. In some embodiments, the system 100 may receive data periodically and/or continuously. With respect to FIG. 1, the truck 102 may receive signals that indicates presence of the objects, such as abandoned vehicle 460 of FIG. 4.

At step 515, the method continues by determining a first value associated with the first signal. In this step, a value corresponding to a classification of the received signal is determined and may be applied to the received signal. For example, the signal received from the camera system 220 may indicate the presence of an object on the side of the road that truck 102 is travelling on. At step 515, the received signal may be assigned a value of "1" to indicate the presence of an object. While the value "1" is used as an example, it should be understood that any value may be used to indicate a classification of the object. The determining and assigning that may happened at step 515 may be executed by a processor local to or remote from the truck 102. In another embodiment, if the signal received by the camera system 220 indicates an absence of an object on the side of the road, the determined value assigned to the signal may be a "0."

At step 520, the method continues by the method continues by assigning a first confidence value to a confidence level, wherein the first confidence value is associated with the first value. Upon determining a value corresponding to the signal, a confidence value is assigned to a confidence level. The confidence value is indicative of the certainty that the system is correct in its identification and classification of the presence or absence of an object. This confidence value may be determined by any number of methods. For example, the system executing the method described herein may determine a confidence value by analyzing various factors and metrics during the detection and classification process, as executed by shoulder analysis module 300. The specific methods can vary depending on the type of system. Some common approaches use probability and statistical modeling, training and validation, uncertainty estimation, confidence calibration, and feedback loops.

Systems and models such as shoulder analysis module 300 may utilize statistical techniques to estimate the likelihood or probability of a particular outcome. The confidence level can be represented as a probability score or a confidence interval, indicating the system's level of certainty. The shoulder analysis module 300 may be trained on labeled datasets where the correct answers or truth are known. During training, the model learns patterns and relationships from the data, and its confidence level can be assessed by evaluating its accuracy and performance on validation or test datasets. Higher accuracy on validation data generally translates to higher confidence. The shoulder analysis module 300 may incorporate mechanisms to estimate uncertainty. This can be done through Bayesian inference, Monte Carlo sampling, or other techniques that capture the model's confidence in its predictions. Uncertainty estimation helps identify cases where the model may be less confident or where additional human intervention may be required. Confidence calibration: The shoulder analysis module 300 may be calibrated to ensure that its predicted confidence levels align well with the actual accuracy of their predictions. Calibration involves adjusting the model's output probabilities to reflect the true likelihood of correctness, improving the reliability of the confidence level estimates. Feedback loops and performance monitoring: The shoulder analysis module 300 may have feedback loops that enable it to learn and improve over time. By collecting feedback and monitoring their performance in real-world scenarios, shoulder analysis module 300 can refine its confidence level estimates and adapt to different conditions or edge cases.

At step 525, the method continues by storing the first confidence value in a memory. The memory in which the first confidence value is stored may be housed local to or remote from truck 102. In addition to the confidence value being stored in the memory, the first signal and first value may also be stored in the memory for use by a processor in implementing the described method. The values stored in the memory may be retrievable and accessible by the processing unit of truck 102 and in some embodiments, the values stored in the memory may be retrievable and accessible to a fleet of trucks.

At step 530, the method continues by, responsive to the first confidence value exceeding a confidence threshold, adjusting a first operating parameter of a vehicle traveling on the road. In some embodiments, the system may require the confidence value of the first value to be above a certain threshold before adjusting the first operating parameter of the truck 102. For example, when determining that the first signal received by the camera system 220 indicates the presence of the object, the system determines and assigns a first value associated with the signal. However, in some embodiments, the system must have a minimum threshold of confidence that the value is correctly associated with the signal. This confidence threshold may be determined by any of the above-described methods for determining the confidence value.

Once the confidence value exceeds the confidence threshold, the system adjusts the first operating parameter. In some embodiments, the first value indicates the presence of an object on the side of the road, but not what the object is. In other embodiments, the first value indicates the absence of an object on the side of the road. In that embodiment, no operating parameters are adjusted based on the first value. When the first value indicates the presence of an object, the system may begin adjusting its course of travel (either by speed, direction, or communication) to prepare for receiving a second signal that can provide the system with more fidelity in determining what the object is. The truck 102 may adjust the speed that the truck 102 is moving. For example, the truck 102 may decelerate so as to be able to come to a full stop by the time the truck 102 reaches the object (e.g., abandoned vehicle 460). The truck 102 may need to come to a complete stop because the object may have caused a traffic jam with vehicles in the left lane 410 and right lane 412. In other embodiments, the truck 102 may determine that it may need to change lanes away from the object in the shoulder 416. In this case, the truck 102 may begin scanning right lane 412 for an opening to change lanes. If no opening exists, the truck 102 may enable a turn signal to create an opening in the event the truck 102 needs to change lanes as it approaches the object.

At step 535, the method continues by responsive to entering a threshold range of the object, receiving a second signal from a second sensor configured to detect the presence of the object on the shoulder of the road. The preceding steps are implemented to increase the amount of information and time to make decisions. In some embodiments, the camera system 220 may receive data at a farther distance than the LiDAR system 222. However, the camera system 220 may collect lower fidelity information at the farther distance. In this instance, while the camera system 220 may not give the truck 102 all the information that it can gather from the LiDAR system 222 at a closer position, it can give truck 102 enough information to begin making decisions and preparing to make decisions once the truck 102 reaches a closer distance. Once the truck 102 reaches the LiDAR perception threshold, the system begins receiving signals from the LiDAR system 222. The LiDAR system 222 is used to verify the first signal and associated value and further classify the object from a detailed classification.

At step 540, the method continues by determining a second value associated with the second signal. As above, the system may determine a second value associated with the second signal to both indicate the presence or absence of an object on the shoulder, but also a detailed classification of the object. While the method describes a single, second value, the second value may be any number of values or variables to appropriately describe the object. For example, the system may determine and/or assign a value to indicate the presence of vehicles, emergency pull-off areas, road signs, guardrails or barriers, roadside assistance vehicles, debris or litter, pedestrians or cyclists, wildlife, drainage ditches, and emergency phones, etc.

At step 545, the method continues by assigning a second confidence value to the confidence level, wherein the second confidence value is associated with the second value. Again, just as above, the system determines and assigns a confidence value of the second value. This confidence value may be associated, or otherwise influenced, by the first confidence value. For example, if the second value agrees as to the presence of an object, then the second confidence value may be greater than if there were a disagreement between the two values.

At step 550, the method continues by storing the second confidence value in the memory. As above, the second confidence value is stored in the memory. In some embodiments, the memory is the same as the memory that stores the first confidence value. In some embodiments, the memories are different. In some embodiments, the second value and second signal are also stored in the memory.

At step 555, the method continues by, responsive to the second confidence value exceeding a second confidence threshold, adjusting a second operating parameter of the vehicle. In some embodiments, the truck 102 determines that it must further adjust another (i.e., a second) operating parameter to avoid running out of drivable surface. Drivable surface is the surface that is available for the truck 102 to drive on. This can be both physical and legal. For example, a ditch would be non-drivable surface. Likewise, a lane next to a parked emergency vehicle may be a non-drivable surface if the law of the jurisdiction requires vehicles to move over for a parked emergency vehicle. In an example, the truck 102 may slow down upon sensing with the camera system 220, above a certain confidence level, that there was an object on the side of the road. Upon reaching the LiDAR perception threshold 455, and further verifying the presence of the object and further classifying the object, the truck 102 may initiate a lane change from left lane 410 to right lane 412. The second operating parameter, in this example, would be the steering angle, a turn signal, a speed, etc. While the method herein discloses adjusting a single second operating parameter, any number of operating parameters may be adjusted at step 555.

It is to be understood that the method 500 is not limited to the steps and features explicitly listed therein and that modifications including additional or fewer steps and/or features are within the scope of the various embodiments described herein. The systems and methods described herein may be used for perceiving, classifying, and responding to an object on the shoulder of the road, but also objects generally: both on the road, above the road, and on the side of the road.

It should now be understood that image data (e.g., camera data and/or LiDAR data) obtained by one or more ego vehicles in a fleet of vehicles can be captured, recorded, stored, and labeled with ground truth location data for use to train a shoulder analysis machine learning model(s) to detect, classify, and respond to real time image data captured by an ego vehicle using a camera or LiDAR system and presenting the captured real time image data to the machine learning model(s). Use of such models may significantly reduce computational requirements aboard a fleet of vehicles utilizing the method(s) and may make the vehicles more robust to meeting location-based and perception requirements, such as localization and behaviors planning and mission control.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by a processor, a first signal from a first sensor configured to detect a presence of an object positioned on a shoulder of a road;
determining, by the processor, a first value associated with the first signal by classifying, using a binary classification machine learning model executed by the processor, the first signal into the first value, the first value indicating the presence of the object;
assigning, using the binary classification machine learning model, a first confidence value to a confidence level, wherein the first confidence value is associated with the first value and indicates a likelihood that the first value correctly indicates the presence of the object;
storing, by the processor, the first confidence value in a memory;
responsive to the first confidence value exceeding a confidence threshold, adjusting, by the processor, a first operating parameter of a vehicle traveling on the road;
responsive to entering a threshold range of the object, receiving, by the processor, a second signal from a second sensor configured to detect the presence of the object on the shoulder of the road;
determining, by the processor, a second value associated with the second signal by classifying, using a detailed classification machine learning model executed by the processor, the second signal into the second value, the second value indicating a detailed classification of the object;
assigning, using the detailed classification machine learning model, a second confidence value to the confidence level, wherein the second confidence value is associated with the second value and indicates a likelihood that the second value correctly indicates the detailed classification of the object;

storing, by the processor, the second confidence value in the memory; and responsive to the second confidence value exceeding a second confidence threshold, adjusting, by the processor, a second operating parameter of the vehicle.

2. The computer-implemented method of claim 1, wherein the second operating parameter is adjusted to avoid the vehicle running out of a drivable surface.

3. The computer-implemented method of claim 1, wherein the first sensor is configured to collect data from which the processor can determine a binary classification of the object.

4. The computer-implemented method of claim 1, wherein the first sensor and the second sensor are positioned on the vehicle traveling on the road.

5. The computer-implemented method of claim 1, wherein the vehicle is an autonomous vehicle.

6. The computer-implemented method of claim 1, wherein the first sensor is an image-collecting camera, and the second sensor is a light detection and ranging ("LIDAR") sensor.

7. The computer-implemented method of claim 1, wherein the first operating parameter and the second operating parameter are one of an engine speed, steering angle, braking amount, gear engagement, lighting status, and aural warning.

8. The computer-implemented method of claim 1, wherein the processor is remote to the vehicle and communicatively coupled to a vehicle control system locally housed on the vehicle, the vehicle control system configured to implement adjusting the first operating parameter and the second operating parameter.

9. A system comprising:
a non-transitory computer-readable medium comprising instructions that are configured to be executed by at least one processor associated with an automated vehicle to:
receive a first signal from a first sensor configured to detect a presence of an object positioned on a shoulder of a road;
determine a first value associated with the first signal by classifying, using a binary classification machine learning model executed by the processor, the first signal into the first value, the first value indicating the presence of the object;
assign, using the binary classification machine learning model, a first confidence value to a confidence level, wherein the first confidence value is associated with the first value and indicates a likelihood that the first value correctly indicates the presence of the object;
store the first confidence value in a memory;
responsive to the first confidence value exceeding a confidence threshold, adjust a first operating parameter of a vehicle traveling on the road;
responsive to entering a threshold range of the object, receive a second signal from a second sensor configured to detect the presence of the object on the shoulder of the road;
determine a second value associated with the second signal by classifying, using a detailed classification machine learning model executed by the processor, the second signal into the second value, the second value indicating a detailed classification of the object;
assign, using the detailed classification machine learning model, a second confidence value to the confidence level, wherein the second confidence value is associated with the second value and indicates a likelihood that the second value correctly indicates the detailed classification of the object;
store the second confidence value in the memory; and
responsive to the second confidence value exceeding a second confidence threshold, adjust a second operating parameter of the vehicle.

10. The system of claim 9, wherein the at least one processor is remote to the vehicle and communicatively coupled to a vehicle control system locally housed on the vehicle, the vehicle control system configured to implement adjusting the first operating parameter and the second operating parameter.

11. The system of claim 9, wherein the second operating parameter is adjusted to avoid the vehicle running out of a drivable surface.

12. The system of claim 9, wherein the first sensor is configured to collect data from which the at least one processor can determine a binary classification of the object.

13. The system of claim 9, wherein the first sensor and the second sensor are positioned on the vehicle traveling on the road.

14. The system of claim 9, wherein the vehicle is an autonomous vehicle.

15. The system of claim 9, wherein the first sensor is an image-collecting camera, and the second sensor is a light detection and ranging ("LIDAR") sensor.

16. The system of claim 9, wherein the first operating parameter and the second operating parameter are one of an engine speed, steering angle, braking amount, gear engagement, lighting status, and aural warning.

17. A vehicle comprising a processor configured to:
receive a first signal from a first sensor configured to detect a presence of an object positioned on a shoulder of a road;
determine a first value associated with the first signal by classifying, using a binary classification machine learning model executed by the processor, the first signal into the first value, the first value indicating the presence of the object;
assign, using the binary classification machine learning model, a first confidence value to a confidence level, wherein the first confidence value is associated with the first value and indicates a likelihood that the first value correctly indicates the presence of the object;
store the first confidence value in a memory;
responsive to the first confidence value exceeding a confidence threshold, adjust a first operating parameter of the vehicle;
responsive to entering a threshold range of the object, receive a second signal from a second sensor configured to detect the presence of the object on the shoulder of the road;
determine a second value associated with the second signal by classifying, using a detailed classification machine learning model executed by the processor, the second signal into the second value, the second value indicating a detailed classification of the object;
assign, using the detailed classification machine learning model, a second confidence value to the confidence level, wherein the second confidence value is associated with the second value and indicates a likelihood that the second value correctly indicates the detailed classification of the object;

store the second confidence value in the memory; and responsive to the second confidence value exceeding a second confidence threshold, adjust a second operating parameter of the vehicle.

18. The vehicle of claim 17, wherein the processor is configured to adjust the second operating parameter to avoid the vehicle running out of a drivable surface.

19. The vehicle of claim 17, wherein the first operating parameter and the second operating parameter are one of an engine speed, steering angle, braking amount, gear engagement, lighting status, and aural warning.

20. The vehicle of claim 17, wherein the first sensor is configured to collect data from which the processor can determine a binary classification of the object.

\* \* \* \* \*